March 31, 1964  C. B. BOURGEOUS  3,126,653
MEANS OF AUTOMATIC GRADE CONTROL
Filed Sept. 18, 1961  6 Sheets-Sheet 1
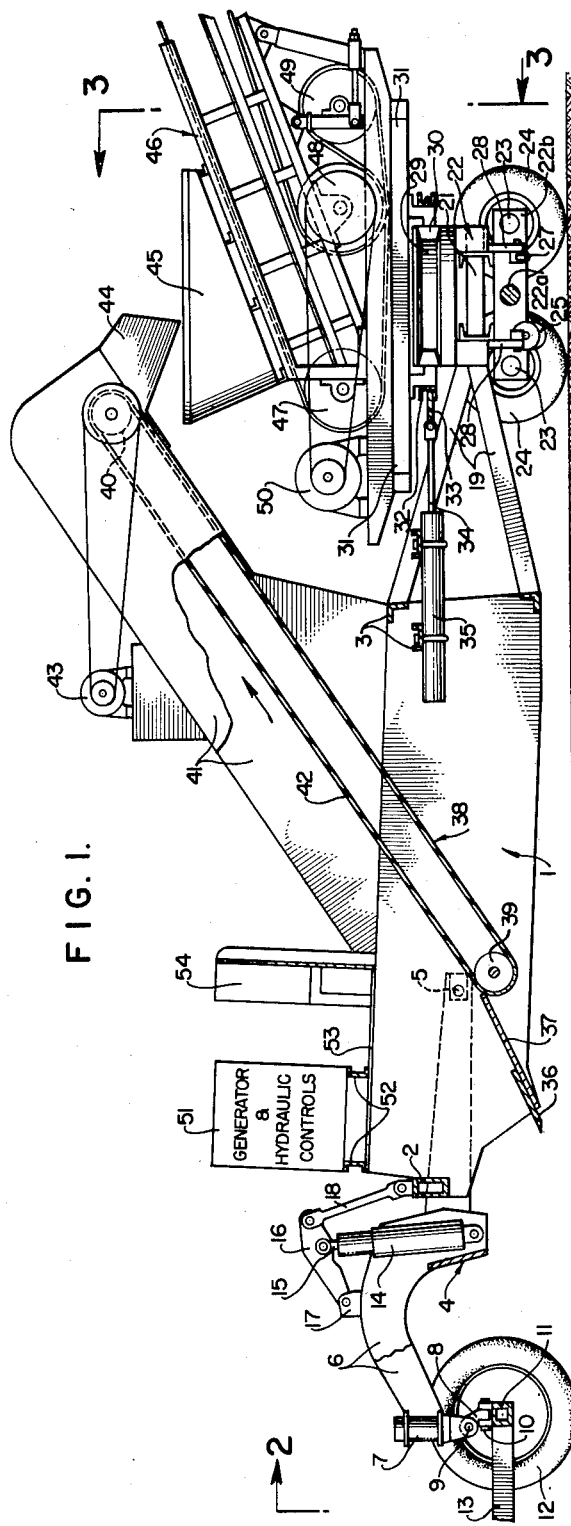
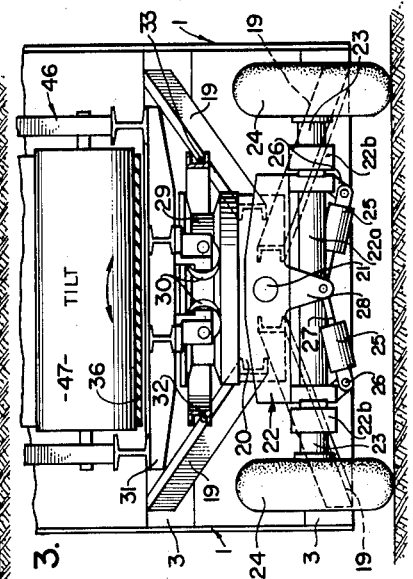
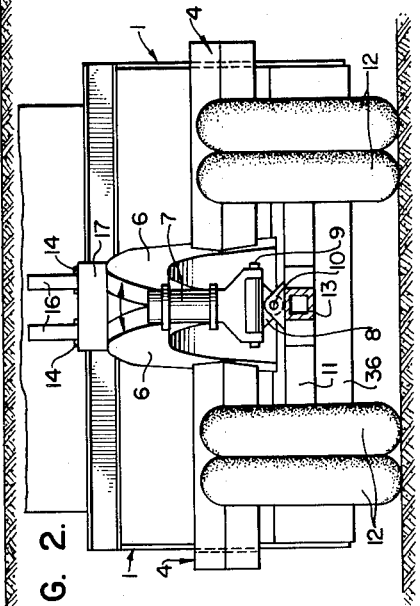
INVENTOR.
CLARENCE BANKS BOURGEOUS
BY
ATTORNEYS.

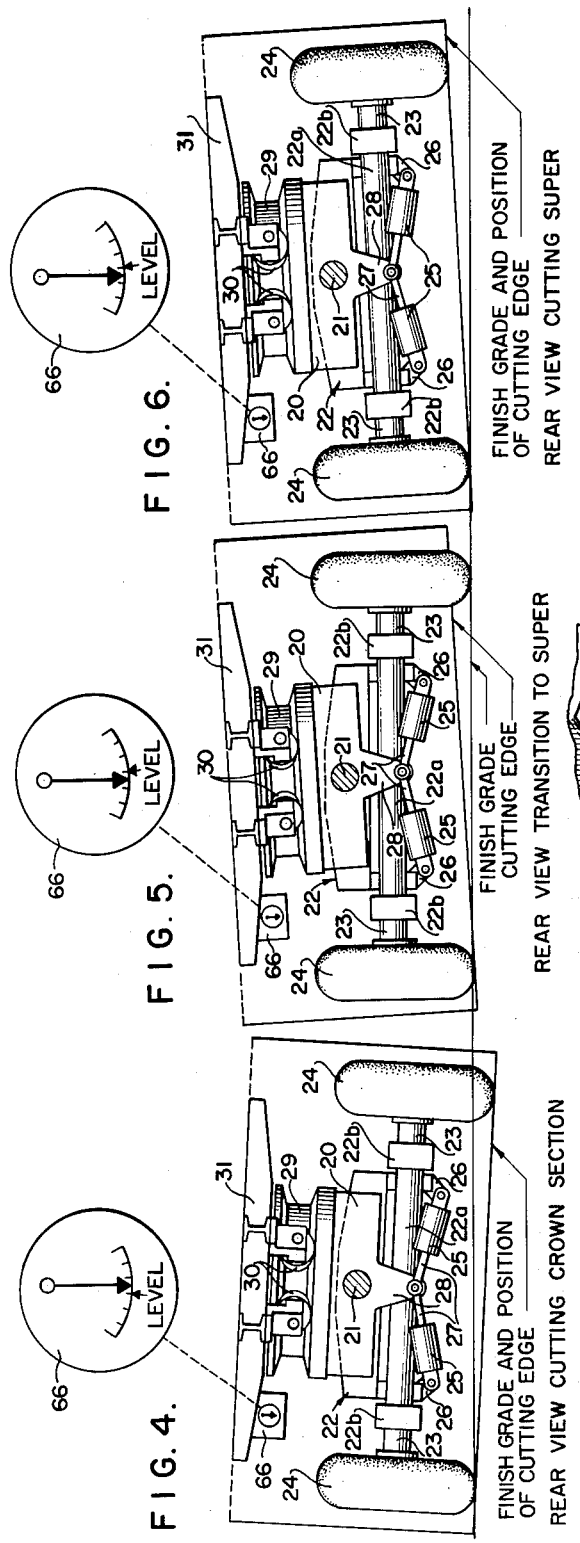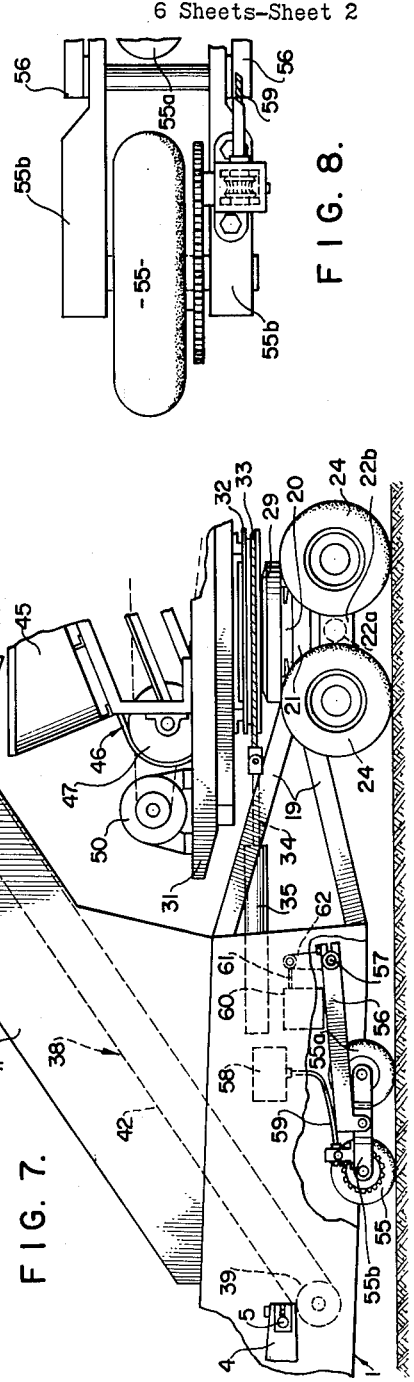

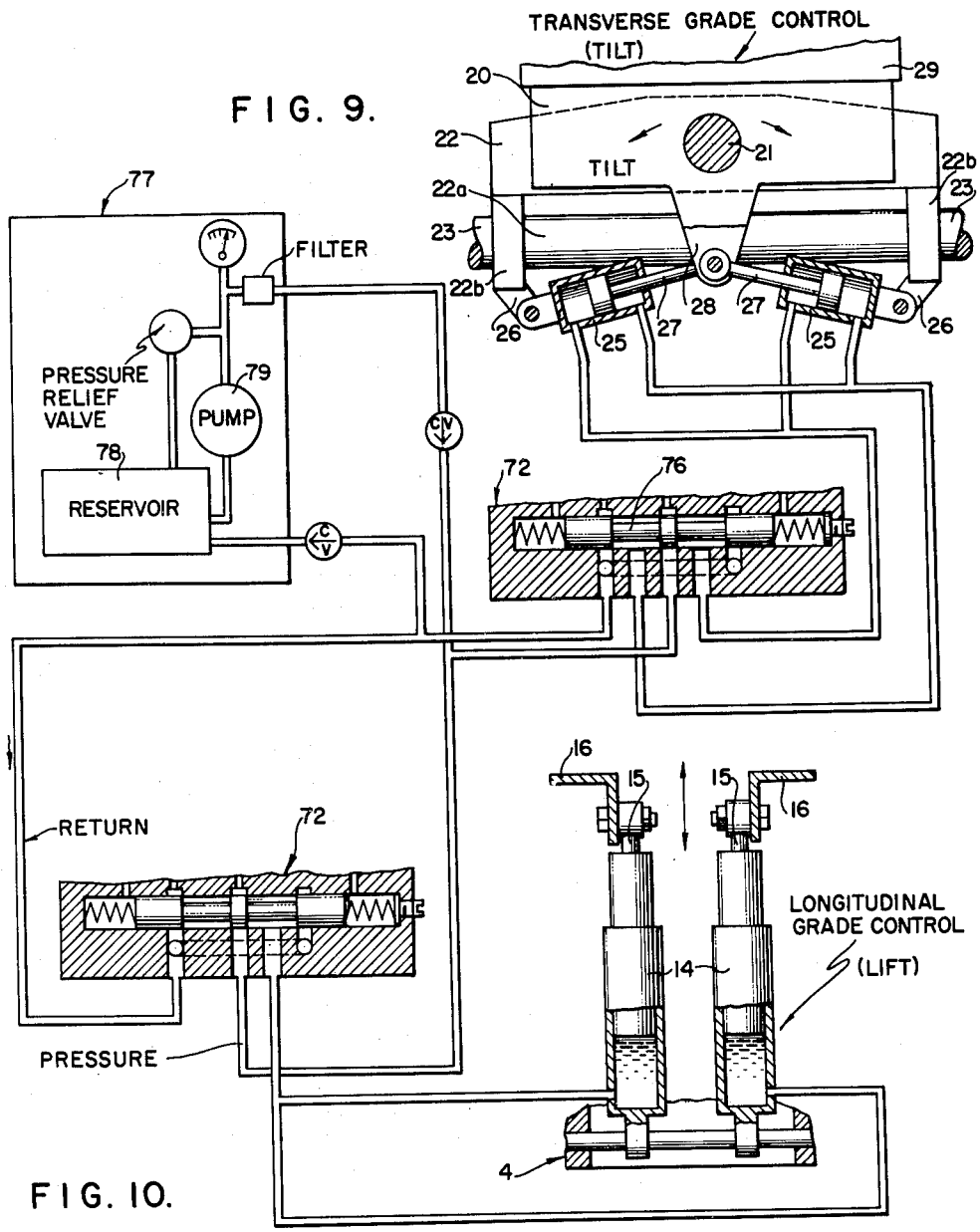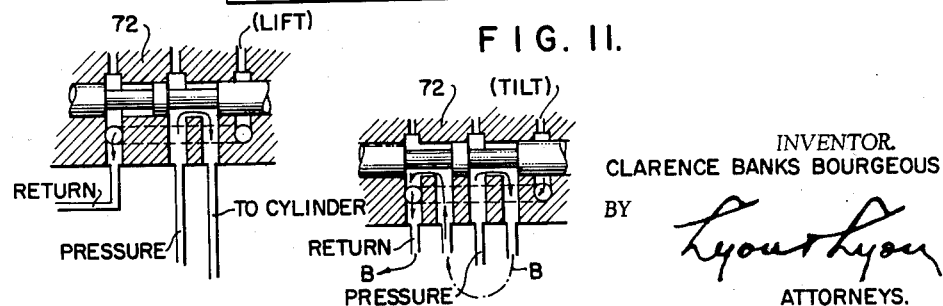

March 31, 1964  C. B. BOURGEOUS  3,126,653
MEANS OF AUTOMATIC GRADE CONTROL
Filed Sept. 18, 1961  6 Sheets-Sheet 5
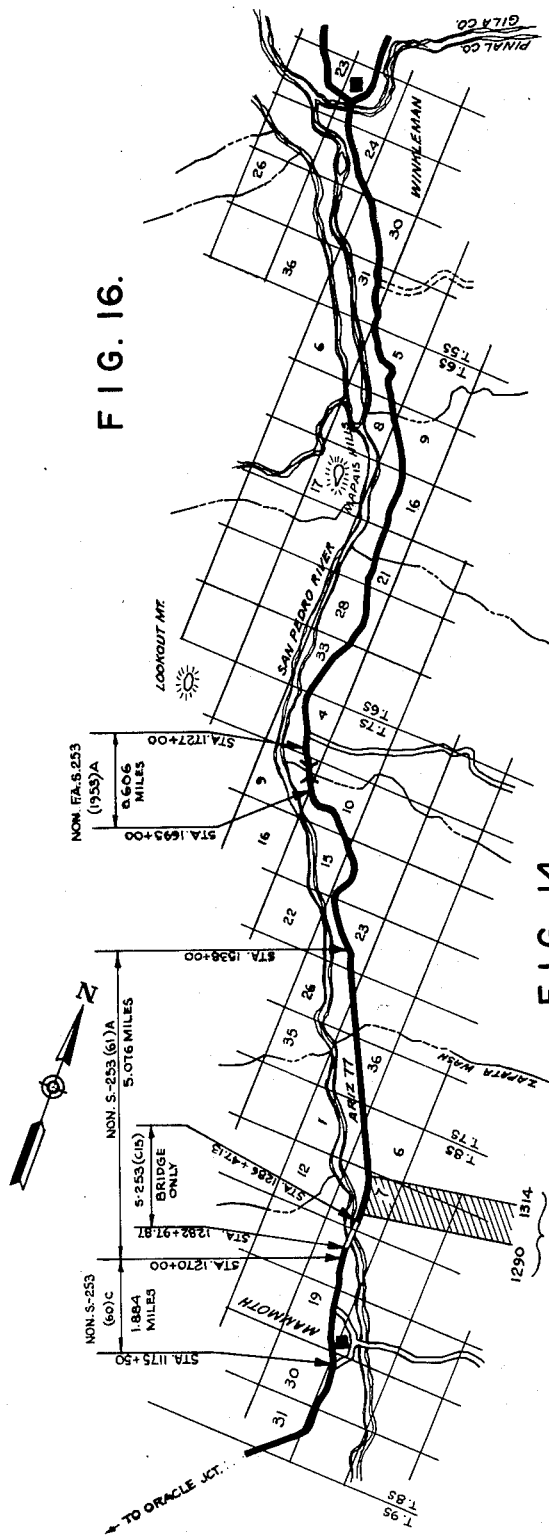
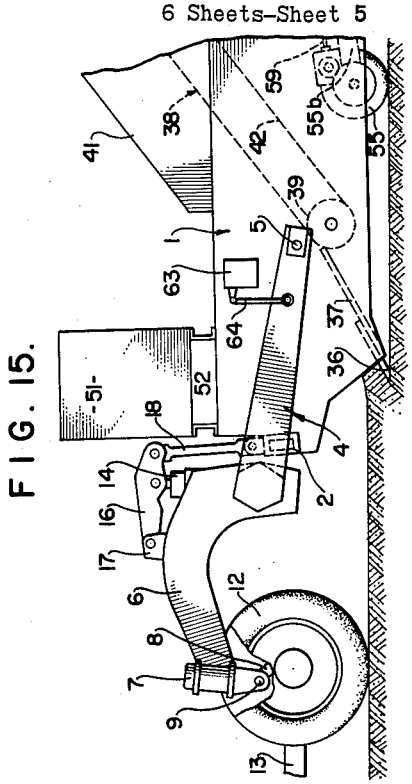
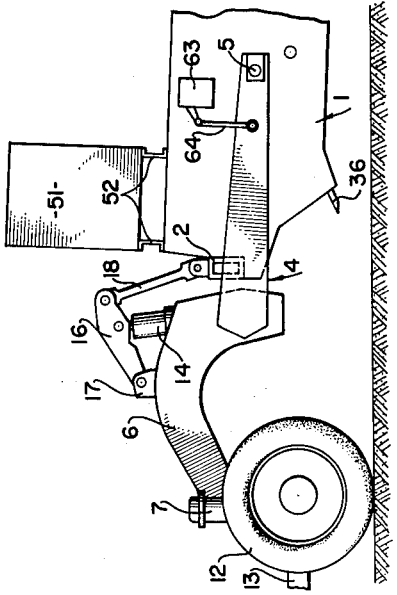
INVENTOR.
CLARENCE BANKS BOURGEOUS
BY
ATTORNEYS.

March 31, 1964    C. B. BOURGEOUS    3,126,653
MEANS OF AUTOMATIC GRADE CONTROL
Filed Sept. 18, 1961    6 Sheets-Sheet 6

INVENTOR.
CLARENCE BANKS BOURGEOUS
BY *Lyon & Lyon*
ATTORNEYS.

United States Patent Office 3,126,653
Patented Mar. 31, 1964

3,126,653
MEANS OF AUTOMATIC GRADE CONTROL
Clarence Banks Bourgeous, % Garth Nelson, P.O. Box 5,
Yuma, Ariz.
Filed Sept. 18, 1961, Ser. No. 138,789
10 Claims. (Cl. 37—108)

This invention relates to means and method of automatic grade control, more particularly to means and method of producing a final graded surface for highways, airstrips, railroad beds, building sites; or wherever a strip or area of land must be leveled, sloped, or contoured according to predetermined specifications.

The inventional method of, for example, constructing a highway involves an initial survey to determine existing grades. From this survey the desired finished grade is computed. Various types of heavy earth-moving equipment, such as carryalls, motor graders, and bulldozers, are used to remove excess material and fill in low areas to bring the surface to the specified finished grade.

The initial survey is not sufficient, and extensive additional surveys must be made and grade stakes positioned to aid the operators in estimating the finished grade. The grade stakes serve only as crude reference points and often are moved, broken, or destroyed by equipment, leaving much of the final grading process to the skill and judgment of the individual operators. If the nature of the undertaking requires an accurate, finished grade, as in the case of a highway, the use of survey markers and reliance on operator judgment develops into a major problem. Often the surface must be regraded to correct errors. With the problem as outlined broadly above in mind, the objects of this invention include:

First, to provide an apparatus and method of automatic grade control wherein a survey is made and the information coded or translated to suitable control tapes; then the information is utilized in control apparatus which is carried by a grading machine, the grading machine having operating devices responsive to the control apparatus so as to regulate the tilt and depth of cut in accordance with the survey so that a finished grade is provided. The grading machine is also provided with a measuring wheel which causes the control tape to move in proportion to movement of the grading machine, so that for every point along the control tape the machine occupies a corresponding point in the section of roadbed, or the like, being graded.

Second, to provide a means and method of automatic grade control which virtually eliminates the need of setting out final grade stakes. However, a few may be used, spaced substantially from each other at check points, so that the accuracy of the grade control may be verified from time to time.

Third, to provide a means and method of automatic grade control which utilizes a grading machine capable of making a wide and deep cut so that a substantial departure of the rough grade from the finished grade may be tolerated.

Fourth, to provide a means and method of automatic grade control which utilizes a grading machine having a blade adapted to cut into the earth, an elevating conveyor behind the blade to raise the earth, and a turnable final conveyor adapted to discharge the earth into companion trucks which are moved with the grading machine, or to discharge the earth laterally of the roadbed, or the like.

Fifth, to provide a means and method of automatic grade control wherein the grading machine utilizes a rearward set of wheels which ride on the finished grade, and serve to establish a reference plane utilized by the control apparatus to determine the depth and angle of cut, and also serving as a surface on which the measuring wheel rotates freely so as to measure accurately the travel of the grading machine.

Sixth, to provide a means and method of grade control which need not be limited to a single pass over the area to be graded; but if the depth of cut is greater than the capacity of the grading machine several passes may be made, the machine making its major cut until the control apparatus indicates an approach to final grade and effects adjustment of the depth and angle of cut.

With the above and other objects in view, as may appear hereinafter, reference is directed to the accompanying drawings in which:

FIGURE 1 is a substantially diagrammatical, longitudinal, sectional view of a grading machine adapted for the purposes of this invention;

FIGURE 2 is a transverse sectional view thereof taken through 2—2 of FIGURE 1 showing the front end of the machine;

FIGURE 3 is a transverse sectional view taken through 3—3 of FIGURE 1 showing the rear end of the machine;

Figure 13:
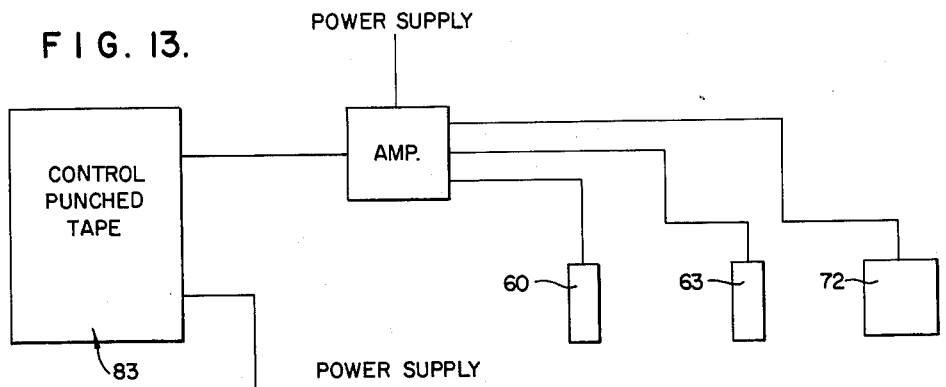
Figure 12:
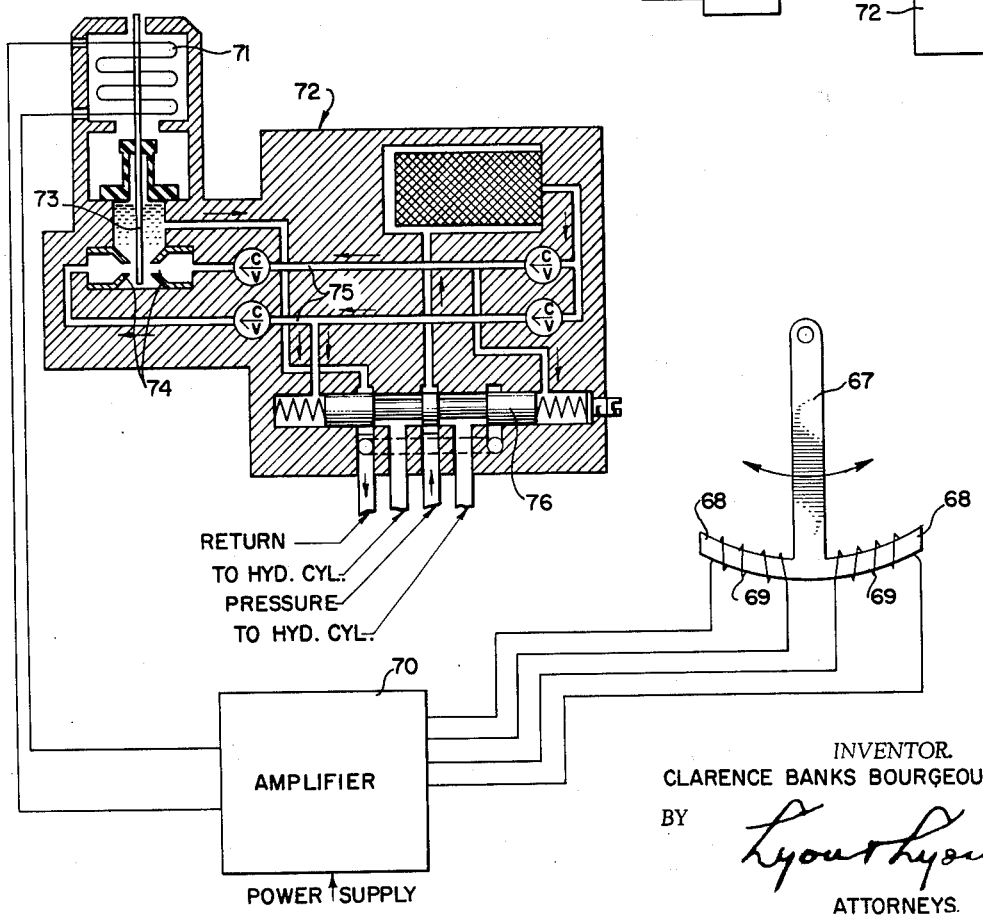
Figure 17:
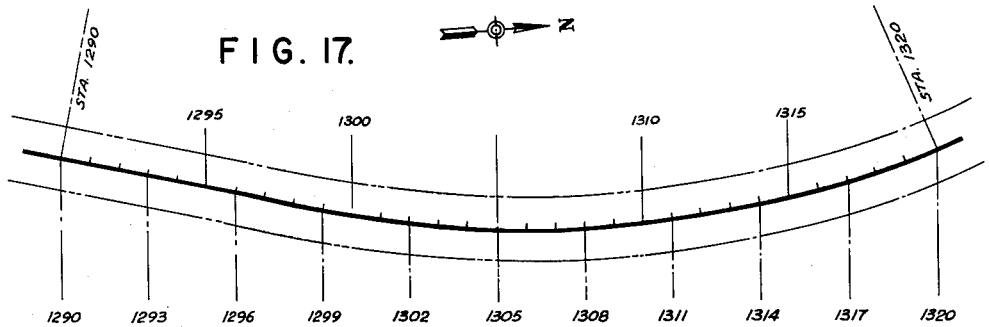
Figure 18:
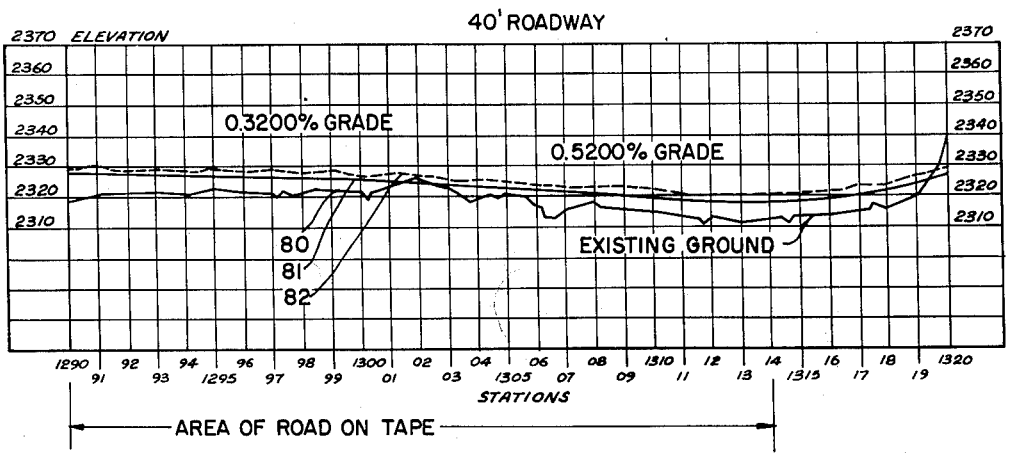
Figure 19:
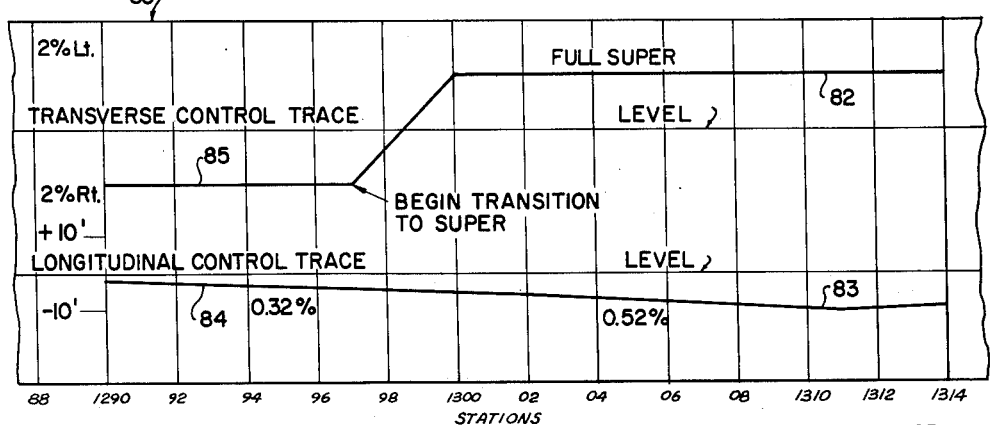

FIGURES 4, 5, and 6 are substantially diagrammatical views taken in the plane of FIGURE 3, and showing the operation of the tilting mechanism for the purpose of transverse grade control;

FIGURE 7 is a fragmentary side view of the machine showing particularly the measuring wheel which operates the control tape unit;

FIGURE 8 is an enlarged fragmentary, plan view of the measuring wheel;

FIGURE 9 is a diagrammatical view showing essential portions of the hydraulic system for operating the longitudinal grade control and transverse grade control mechanisms;

FIGURE 10 is a fragmentary, diagrammatical view of the longitudinal grade control valve mechanism shown in its opposite position from that shown in FIGURE 9;

FIGURE 11 is a fragmentary, diagrammatical view of the transverse grade control valve shown in the opposite position from that shown in FIGURE 9;

FIGURE 12 is a diagrammatical view showing a transducer adapted for use to effect longitudinal and transverse grade control, and illustrating a servo valve adapted for cooperation therewith;

FIGURE 13 is a block diagram showing the relationship of the control tape to the grade control transducers and their servo valves;

FIGURE 14 is a fragmentary side view showing the short portion of the grading machine and indicating a possible location of the longitudinal grade control transducer with the cutting blade of the grading machine shown in its raised position;

FIGURE 15 is a similar fragmentary, side view showing the cutting blade in an operating position;

FIGURE 16 is a typical highway map indicating the route of a proposed highway;

FIGURE 17 is an enlarged view thereof, representing the shaded areas between stations 1290 and 1314 of FIGURE 16;

FIGURE 18 is a profile view of the section of a proposed roadway represented in FIGURE 17, and showing the existing or initial grade, the rough grade, and the finished grade;

FIGURE 19 is an enlarged section of the control tape with the longitudinal control means and the transverse control means represented graphically as "traces."

A grading machine adapted to the exercise of the present invention is shown best in FIGURES 1 through 8, 14, and 15. The grading machine includes a pair of side frame structures 1 which are joined by a front cross beam 2 and rear cross beams 3 to dispose the side frame structures 1 in parallel relation.

Extending between the side frame structures 1, forwardly of the beam 2, then rearwardly along the sides of the frame structures, is a U-shaped yoke 4 which is joined at its extremities to the side frame structures 1 by pivotal connections 5.

The central portion of the yoke 4 is provided with a pair of forwardly extending, converging arch beams 6 which terminate in a steering pivot 7 having a vertical axis. The steering pivot is connected by a link 8 having a transverse pivot pin 9 and a longitudinal pivot pin 10 to a front axle 11. The front axle 11 is supported by wheels 12. A draw bar 13 extends forwardly from the axle 11 for connection to a tractor or other means for pulling the grading machine.

Supported on the cross portion of the yoke 4 is one or more elevation control cylinders 14 containing pistons from which extend rods 15, the upper ends of which are joined to one or more levers 16. Each lever is joined at its forward end to a fulcrum bracket 17 mounted on a corresponding arch beam 6. The rearward ends of the levers 16 are connected by links 18 to the front cross beam 2. The elevation control cylinders raise and lower the side frame structures 1 with respect to the front wheels 12.

The rearward ends of the side frame structures 1 are provided with two pairs of rearwardly converging struts 19 which are joined to a turntable base 20. The turntable base is supported on a longitudinal fulcrum shaft 21, preferably located in axial alignment with the longitudinal pivot pin 10. The fulcrum shaft 21 pivots a rear wheel frame 22 so that the rear wheel frame may tilt about the longitudinal axis of the shaft 21. The rear wheel frame 22 in turn is provided with a transverse pivot shaft 22a which supports longitudinally extending beams 22b. The beams are provided at their extremities with stub axles 23 which carry rear wheels 24.

Interconnected between the turntable base 20 and rear wheel frame 22 are two pairs of tilting or transverse control cylinders 25. Each pair of control cylinders 25 are connected by brackets 26 to the rear wheel frame 22, and are provided with pistons and rods 27 which are connected to a depending bracket 28 secured to the turntable base 20.

The turntable base 20 supports a circular turntable track 29, which may be in the form of a circular channel, which receives wheels 30. The wheels 30 support a turntable frame 31 so that the turntable frame 31 may rotate about a vertical axis. This may be accomplished by a turning rim 32 secured to the turntable frame 31 and receiving a cable 33. The extremities of the cable 33 are attached to piston rods 34, which extend rearwardly from turning cylinders 35 suitably secured between the side frame structures 1.

Extending between the forward portions of the side frame structures 1 is a forwardly and downwardly directed cutting blade 36. The cutting blade may be removably mounted on a ramp plate 37.

Mounted between the side frame structures 1 is a conveyor 38 having a lower roller 39 located behind and below the rear edge of the ramp plate 37, and an upper roller 40 supported between side walls 41 extending upwardly and rearwardly from the side frame structures 1. A belt or other type of conveyor member 42 extends between the rollers 39 and 40. It should be understood that the conveyor per se may be conventional, that sprockets may be substituted for the rollers, and that the conveyor member 42 may be supported on chains.

A drive motor 43 is suitably supported from one of the side walls 41 to drive the upper roller 40 of the conveyor 38 so that the upper reach of the conveyor moves upwardly and rearwardly, as indicated by the arrow in FIGURE 1.

The conveyor 38 discharges through a chute 44 into a hopper 45 supported above the turntable frame 31. The turntable frame also supports a belt conveyor 46. The lower portion of the belt conveyor 46 underlies the hopper 45. The belt conveyor 46 is per se conventional, and may include a lower end drum 47, a drive pulley 48 mounted under the conveyor, and an idler pulley 49 also mounted under the conveyor and so arranged that the lower reach of the belt conveyor 46 may wrap around the drive pulley 48, then around the idler pulley 49, then extend to the end drum 47. A motor 50 is connected to the drive pulley 48.

The motors 43 and 50 are preferably electrical motors, and are operated by a power plant 51 mounted on cross beams 52 adjacent the forward end of the side frame structures 1. The side frame structures may also be interconnected by a deck 53 for access to the power plant 51. Also supported on the deck 53 are suitable hydraulic controls for the operation of the various power cylinders, as will be described in more detail hereinafter. In addition, an electrical control panel 54 may be provided.

Located between the side frame structures 1, under the lower or forward portion of the conveyor 38, is a measuring wheel 55 and idler wheel 55a tandem connected by bars 55b. The bars 55b are connected intermediate their ends to the free end of a forwardly directed strut 56. The rear end of the strut 56 is supported by a shaft 57.

Suitably supported from one of the side frame structures 1 is a control tape unit 58 which is represented diagrammatically. The control tape unit 58 is connected by a flexible drive 59 to the measuring wheel 55. Also supported from one of the side frame structures 1 is a correction transducer 60, which is connected mechanically by a link 61 and lever 62 to the shaft 57. Also mounted on one of the side frame structures is a longitudinal grade control transducer 63, indicated diagrammatically in FIGURE 15, which is connected by a link 64 and lever 65 to one leg of the yoke 4.

Mounted on the grading machine, preferably at any fixed portion thereof, laterally from its longitudinal axis, is a transverse grade control transducer 66. For purposes of illustration, the transverse grade control transducer is shown as secured to the turntable frame 31 in FIGURES 4, 5, and 6.

The transducers may be per se, conventional and are preferably of the type which will indicate a deviation from a vertical axis, and therefore may be represented diagrammatically in the form of a pendulum 67, as shown in FIGURE 12.

The pendulum transducer 67 is provided with oppositely directed armature arms 68 which move with respect to corresponding solenoid coils 69. The output from the solenoid coils is passed through a suitable amplifier 70 and to electrical sensing means 71 forming a part of a servo valve 72, represented diagrammatically in FIGURE 12. The servo valve may be any suitable type, but for purposes of illustration may be the type more fully disclosed in Patent No. 2,767,689, issued October 23, 1956, to W. C. Moog, Jr., entitled "Electrohydraulic Servo Valve."

This type of servo valve includes an electrically-actuated, pressure reaction member 73 disposed between opposed nozzle assemblies 74 so as to favor one or the other of the nozzle assemblies, depending upon the input current. The nozzle assemblies 74 form a part of a pilot circuit 75 which functions to control a valve armature 76 mounted in the body of the servo valve. The valve armature 76 forms a part of a four-way control valve incorporated in the servo valve body, capable of controlling the operation of the power cylinder to which it may be connected.

More specifically, as shown diagrammatically in FIGURE 9, a hydraulic power supply unit 77 including a reservoir tank 78 and pump 79 supplies pressure fluid to the control cylinders. The longitudinal grade control cylinders 14 may be single acting and the associated servo valve 72 may be arranged to raise the cutting blade 36 by supplying pressure fluid to the cylinders 14, or to lower the blade by permitting return flow of pressure fluid to the reservoir tank 78.

The tilt or transverse grade control cylinders 25 are preferably double acting, and the associated servo valve 72 is arranged to supply pressure fluid to either end of each cylinder 25 while simultaneously drawing pressure fluid from the opposite side thereof.

In the exercise of this invention, information obtained from conventional grade surveys is utilized. For purposes of illustration a typical grade survey, representing a section of a highway to be constructed, is shown in FIGURE 16. Of this survey, the shaded section representing the portion between stations 1290 and 1314 is enlarged, as shown in FIGURE 17.

The highway survey not only includes a plan view but also an elevational view, as represented in FIGURE 18. In the elevational view the elevation above sea level, or other reference points, is indicated. Incorporated in this survey is a profile of the initial grade, as indicated by 80. In addition, there may be drawn on the elevation survey a rough grade profile 81 and a final or finished grade profile 82.

From the information obtained by the survey, a control tape 83 is prepared. In actual practice, the control tape may be a conventional punch tape, but for purposes of illustration the information placed on the tape is represented graphically or by trace lines; more particularly, a longitudinal control trace 84 and a transverse control trace 85.

It should be understood that while punch type tape information is preferred, the control tape 83 may, in fact, have graphically represented traces in the form of grooves cut into the tape. In this case, each trace mechanically moves a stylus, the movement of which operates a transducer. Other conventional means involves a trace formed of magnetic material to be followed by a magnetic pickup element, or the trace may be a line contrasting in color to the tape in which a photosensitive pickup unit is utilized. It therefore should be understood that the control tape 33 and the means of sensing the information thereon is per se conventional.

Electrically, the control tape output determined by the trace 84 or the equivalent signal producing means is amplified and combined with signals from the correction transducer 60 and longitudinal grade control transducer 63 to operate the servo mechanism of the corresponding servo valve 72, so as to raise or lower the cutting blade 36. Similarly, the trace 85 or the equivalent signal producing means is amplified and combined with the signal from the tilt or transverse grade control transducer 66 to tilt the cutting blade 36 to the desired angle.

In performing the method which forms a part of this invention, a grade survey is first made in the conventional manner and the elevation of the desired grade is prepared. From this information the control tape 83 is prepared, capable of producing signals compatible with the signals produced by the longitudinal grade control transducer 63 and grade control transducer 66.

Before employing the grade control method, the highway is graded to a level slightly above the desired finished grade. In doing this, any fills are properly compacted so that a firm roadbed is established. The grading machine is then positioned at the start of a section of roadway to be finish graded; and the control tape 83 is installed in the control tape unit 58 and is moved in the tape unit in a conventional manner.

The means for driving the control tape 83 is connected through the flexible drive 59 to the measuring wheel 55, so that the control tape 80 will move in proportion to the actual movement of the grading machine. For example, 1″ of the control tape 83 may represent 10′ of travel of the machine, or any other predetermined ratio may be selected.

In order to properly position the measuring wheel 55 an initial cut may be made by the grading machine so that the measuring wheel 55 rests on the finished grade between the cutting blade and the rear wheels 24. Also, it may be desirable to utilize the correction transducer 60 to aid in adjusting the longitudinal grade control system.

With reference to FIGURES 18 and 19, it will be noted that the initial portion of the grade has a 0.32% slope with respect to the horizontal and that this slope merges later into a 0.52% slope. Initially, then, the cutting blade 36 is adjusted and the transducers are also adjusted so that a neutral condition exists when the cutting blade moves along a path to produce a finished grade having the preselected slope. As the machine moves forward, any deviation from the preselected slope causes the longitudinal grade control transducers 63 to initiate a correction movement.

It is not only necessary to maintain the grading machine in a course which will determine a finished grade longitudinally, but also to tilt the cutting blade 36 so as to control the transverse slope of the grade. For example, as shown in FIGURE 19, it is desired to provide a transverse slope of 2° to the right for the first portion of the section to be graded and then gradually change to the transverse slope until it is 2° to the left. This is accomplished by operation of the transverse grade control transducer 66 which causes the cutting blade 36 to tilt with respect to the rear wheels, as represented in FIGURES 4, 5, and 6.

More specifically, as viewed in FIGURE 4, the transverse grade control slopes to the right with the cutting blade 36 and the wheels in a common plane. This represents the first portion of the transverse control trace 85. As the trace passes through its transition section, the blade 36 is first tilted slightly with respect to the rear wheels 24, as represented in FIGURE 5, changing the transverse slope until the desired slope to the left is attained, whereupon the rear wheels 24 are tilted to the left in correspondence with the plane established by the cutting blade 36, as shown in FIGURE 6.

While for purposes of illustration the grade control means and method has been shown in conjunction with the problem of grading a highway, it should be understood that the control apparatus and method is adapted to other types of grading, as, for example, the grading of airstrips, farm land, irrigation ditches, and the like; in fact, wherever it is necessary to grade land to a preselected surface.

In the method just described it is assumed that a single survey is made, a profile is drawn, the desired finished grade is superposed, and the slope, both longitudinally and transversely, is expressed in degrees from the horizontal. The information contained on the control tape is, therefore, essentially expressions of the longitudinal and transverse slopes.

The finished grade may also be attained by making a second survey, after a rough grade above the finished grade has been established, and expressing the finished grade in terms of departure from the rough grade. Then, assuming that the departure is within the range of cutting depth, the cutting blade may be held to the finished grade level as the machine is moved over the strip to be graded.

It should be understood that in either method the control tape information is derived essentially from a single survey. However, the making of other or check surveys during the course of the grading operation and the modification of the information by such surveys is not precluded.

It should be noted that for many operations the longitudinal grade control may be omitted and only the tilt or transverse grade control utilized. If it is desired to maintain a zero degree transverse slope, or any fixed transverse slope, the control tape need not be used; instead, the pendent transducer and servo valve shown in FIGURE 12 may be used to sense and control the tilting cylinders 25. A fixed biasing current may be supplied to cause the control and operating means to maintain the desired transverse slope.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. Apparatus for grading a strip of earth, comprising: a grading machine having a carriage means to transport said grading machine along a strip of earth, ground-engaging, earth-removing means pivotable about the transverse and the longitudinal axes of said grading machine, means for conveying upwardly and clear of the path of the grading machine the overlying earth removed by said earth-removing means, means including a vertical axis determining control element for effecting vertical movement of said earth-removing means about said transverse axis to vary the depth of cut, and means including a vertical axis determining control element for tilting said earth-removing means about said longitudinal axis to vary the angle of said cut; a program means mounted on said grading machine containing instruction media referenced to a vertical axis and cooperating with said control elements for causing operation of said vertical moving means and said tilting means, said program means being proportionally related to the length of the strip of earth to be graded; and earth-engaging means independent of said carriage means carried by said grading machine for advancing said program means in proportion to travel of said grading machine along said strip of earth.

2. Apparatus for grading a strip of earth, comprising: a grading machine having a carriage means to transport said grading machine along a strip of earth, ground-engaging, earth-removing means pivotable about the transverse and the longitudinal axes of said grading machine, means for conveying upwardly and clear of the path of the grading machine the overlying earth removed by said earth-removing means, means including a vertical axis determining control element for effecting vertical movement of said earth-removing means about said transverse axis to vary the depth of cut, and means for tilting said earth-removing means about said longitudinal axis to vary the angle of said cut; a program means containing instruction media defining the finished grade of said strip of earth; earth-engaging means independent of said carriage means carried by said grading machine for advancing said program means in proportion to travel of said grading machine along said strip of earth; and vertical axis determining transducers operable by said program means to actuate said vertical moving means and said tilting means to produce a depth and angle of cut tending to establish said finished grade.

3. Apparatus for grading a strip of earth, comprising: a grading machine having a carriage means to transport said grading machine along a strip of earth, ground-engaging, earth-removing means pivotable about the transverse and the longitudinal axes of said grading machine, means for conveying upwardly and clear of the path of the machine the overlying earth removed by said earth-removing means, means including a vertical axis determining control element for effecting vertical movement of said earth-removing means about said transverse axis to vary the depth of cut, and means including a vertical axis determining control element for tilting said earth-removing means about said longitudinal axis to vary the angle of said cut; a program means proportioned to the length of said strip of earth, and containing a first instruction media representative of the longitudinal slope of the finished grade of said strip of earth, and a second instruction media representative of the transverse slope of said finished grade; means for advancing said program means in proportion to travel of said grading machine along said strip of earth whereby said cutter blade is maintained in positions corresponding to positions on said program means; a first vertical axis sensing transducer means activated by said first instruction media for activating said means to effect vertical movement of said cutter blade, thereby to maintain at least a point of said cutter blade in coincidence with said finished grade; and a second vertical axis sensing transducer means activated by said second instruction media for actuating said means to effect tilting of said cutter blade, thereby to place said cutter blade in coincidence with the transverse slope of said finished grade.

4. A machine for grading a strip of earth, comprising: spaced side frames; a cutter blade disposed transversely between said side frames; a forward wheel assembly; means pivotally connecting said forward wheel assembly with said side frames for relative movement about a transverse axis to move said cutter blade vertically; longitudinal grade control means for operating said connecting means to effect vertical movement of said cutter blade; a rear wheel assembly disposed in the path cut by said cutter blade; a pivotal connection between said rear wheel assembly and said side frames for relative pivotal movement about a longitudinal axis to tilt said cutter blade with respect to said rear wheel assembly; and transverse grade control means for operating the last named pivotal connection to effect tilting movement of said cutter blade, said transverse control means including a gravity-sensing element to determine the vertical axis, and hydraulic force-applying means to maintain said cutter blade in predetermined angular relation to said vertical axis.

5. A machine for grading a strip of earth, comprising: spaced side frames; a cutter blade disposed transversely between said side frames; a forward wheel assembly; means pivotally connecting said forward wheel assembly with said side frames for relative movement about a transverse axis to move said cutter blade vertically; longitudinal grade control means for operating said connecting means to effect vertical movement of said cutter blade; a rear wheel assembly; a pivotal connection between said rear wheel assembly and said side frames for relative pivotal movement about a longitudinal axis to tilt said cutter blade with respect to said rear wheel assembly; transverse grade control means for operating the last named pivotal connection to effect tilting movement of said cutter blade; each of said longitudinal and transverse grade control means including a gravity-sensing element to determine the vertical, and hydraulic force devices responsive thereto to maintain said cutter blade in predetermined relation to the vertical; a first conveyor disposed between said side frames for elevating earth cut by said cutter blade; a second conveyor carried by said rear wheel assembly; means for transferring earth from said first conveyor to said second conveyor; and a turntable interposed between said second conveyor and said rear wheel assembly for directing the discharge end of said second conveyor rearwardly or laterally, in either direction, with respect to the direction of travel of said cutter blade.

6. A machine for grading a strip of earth, comprising: spaced side frames; a cutter blade disposed transversely between said side frames; a forward wheel assembly; means pivotally connecting said forward wheel assembly with said side frames for relative movement about a transverse axis to move said cutter blade vertically; longitudinal grade control means for operating said connecting means to effect vertical movement of said cutter blade; a rear wheel assembly; a pivotal connection between said rear wheel assembly and said side frames for relative pivotal movement about a longitudinal axis to tilt said cutter blade with respect to said rear wheel assembly; transverse grade control means for operating the last named pivotal connection to effect tilting movement of said cutter blade; each of said longitudinal and transverse grade control means including a gravity-sensing element to determine the vertical, and hydraulic force devices responsive thereto to maintain said cutter blade in predetermined relation to the vertical and means for measuring movement of said cutter blade along said longitudinal axis, said means incorporating an instrumentality operable through said longitudinal and transverse grade control means to alter the position of said cutter blade in accordance with predetermined instructions.

7. A grading machine, comprising: a cutter blade; a frame structure and forward and rearward wheel assemblies for moving said cutter blade along a longitudinal path; a longitudinal grade control means for raising and lowering said cutter blade, to vary the depth of cut made by said cutter blade; a transverse grade control means for tilting said cutter blade to vary the angle of cut made by said cutter blade; each of said longitudinal and transverse grade control means including a gravity-sensing element to determine the vertical, and hydraulic force devices responsive thereto to maintain said cutter blade in predetermined relation to the vertical, means for measuring movement of said cutter blade along said path; and means driven by said measuring means for causing operation of said longitudinal and transverse grade control means to alter the position of said cutter blade in accordance with predetermined instructions.

8. An earth-removing machine: a rear wheel assembly including at least one pair of wheels having a common axis and a rear frame structure supported therebetween; a turntable mounted on said rear frame structure; a distributing conveyor extending radially from said turntable including a receiving end disposed over said turntable; a body structure disposed forwardly of said rear wheel assembly and having rearwardly directed struts; journal means connecting said struts and rear frame structure, said journal means defining a horizontal axis perpendicular to the common axis of said rear wheels and coinciding with the longitudinal axis of said body structure; a cutter blade fixed to said body structure at the forward end thereof; an elevating conveyor having a lower forward receiving end immediately behind said cutter blade, and an upper rearward discharge end projecting rearwardly of said body structure over the receiving end of said distributing conveyor; a yoke pivotally connected to the lateral sides of said body structure to define a transverse pivotal axis, and having a cross portion forward of said body structure; steering wheels connected to the cross portion of said yoke; and means for pivoting said yoke to raise and lower the forward end of said body structure thereby to raise and lower said cutter.

9. An earth-removing machine: a rear wheel assembly including at least one pair of wheels having a common axis and a rear frame structure supported therebetween; a turntable mounted on said rear frame structure; a distributing conveyor extending radially from said turntable including a receiving end disposed over said turntable; a body structure disposed forwardly of said rear wheel assembly and having rearwardly directed struts; journal means connecting said struts and rear frame structure, said journal means defining a horizontal axis perpendicular to the common axis of said rear wheels and coinciding with the longitudinal axis of said body structure; an earth-engaging cutter blade at the forward end of said body structure; an elevating conveyor having a lower forward receiving end; and steering wheels connected to the forward end of said body structure.

10. An earth-removing machine as set forth in claim 9, wherein: a piston and cylinder means are disposed at lateral sides of said journal means to tilt said body structure and cutting blade with respect to said rear wheels; and control means including a gravity-sensing element carried by said body structure operates said piston and cylinder means to maintain said cutting blade at a predetermined angle to the vertical.

References Cited in the file of this patent
UNITED STATES PATENTS

| | | |
|---|---|---|
| 1,296,302 | McLaughlin | Mar. 4, 1919 |
| 1,464,444 | Randolph | Aug. 7, 1923 |
| 2,048,434 | Dicks | July 21, 1936 |
| 2,070,436 | Kennedy | Feb. 9, 1937 |
| 2,621,427 | Hulse | Dec. 16, 1952 |
| 2,674,331 | Ovshinsky | Apr. 6, 1954 |
| 2,740,211 | Henry et al. | Apr. 3, 1956 |
| 2,796,685 | Bensinger | June 25, 1957 |
| 2,961,783 | Bowen et al. | Nov. 29, 1960 |
| 3,009,271 | Kuehne et al. | Nov. 21, 1961 |
| 3,058,242 | Ocnaschek | Oct. 16, 1962 |